United States Patent [19]

Pruett

[11] 4,212,167

[45] Jul. 15, 1980

[54] HYDRAULIC BRAKE SYSTEM

[76] Inventor: Lloyd L. Pruett, 1210 Whitney Dr., Columbia, Tenn. 38401

[21] Appl. No.: 24,712

[22] Filed: Mar. 28, 1979

Related U.S. Application Data

[63] Continuation-in-part of Ser. No. 588,670, Jun. 20, 1975, abandoned.

[51] Int. Cl.³ .............................................. B60T 7/02
[52] U.S. Cl. ........................................ 60/594; 60/550
[58] Field of Search ................ 60/551, 555, 594, 550, 60/562, 579, 581, 593, 583

[56] References Cited

U.S. PATENT DOCUMENTS

| | | | |
|---|---|---|---|
| 2,168,719 | 8/1939 | Staude | 60/594 |
| 2,590,144 | 3/1952 | Alward | 60/594 |
| 3,146,597 | 9/1964 | Knauss | 60/594 |
| 3,222,868 | 12/1965 | Stelzer | 60/551 |
| 3,739,579 | 6/1973 | Lutz | 60/594 |
| 3,972,190 | 8/1976 | Sawyer | 60/551 |
| 3,972,192 | 8/1976 | Muterel | 60/562 |

*Primary Examiner*—Abraham Hershkovitz
*Attorney, Agent, or Firm*—Abe Hatcher

[57] ABSTRACT

In a brake system, the addition of an auxiliary cylinder or booster cylinder for use in conjunction with a master cylinder and brake lever to increase force.

4 Claims, 1 Drawing Figure

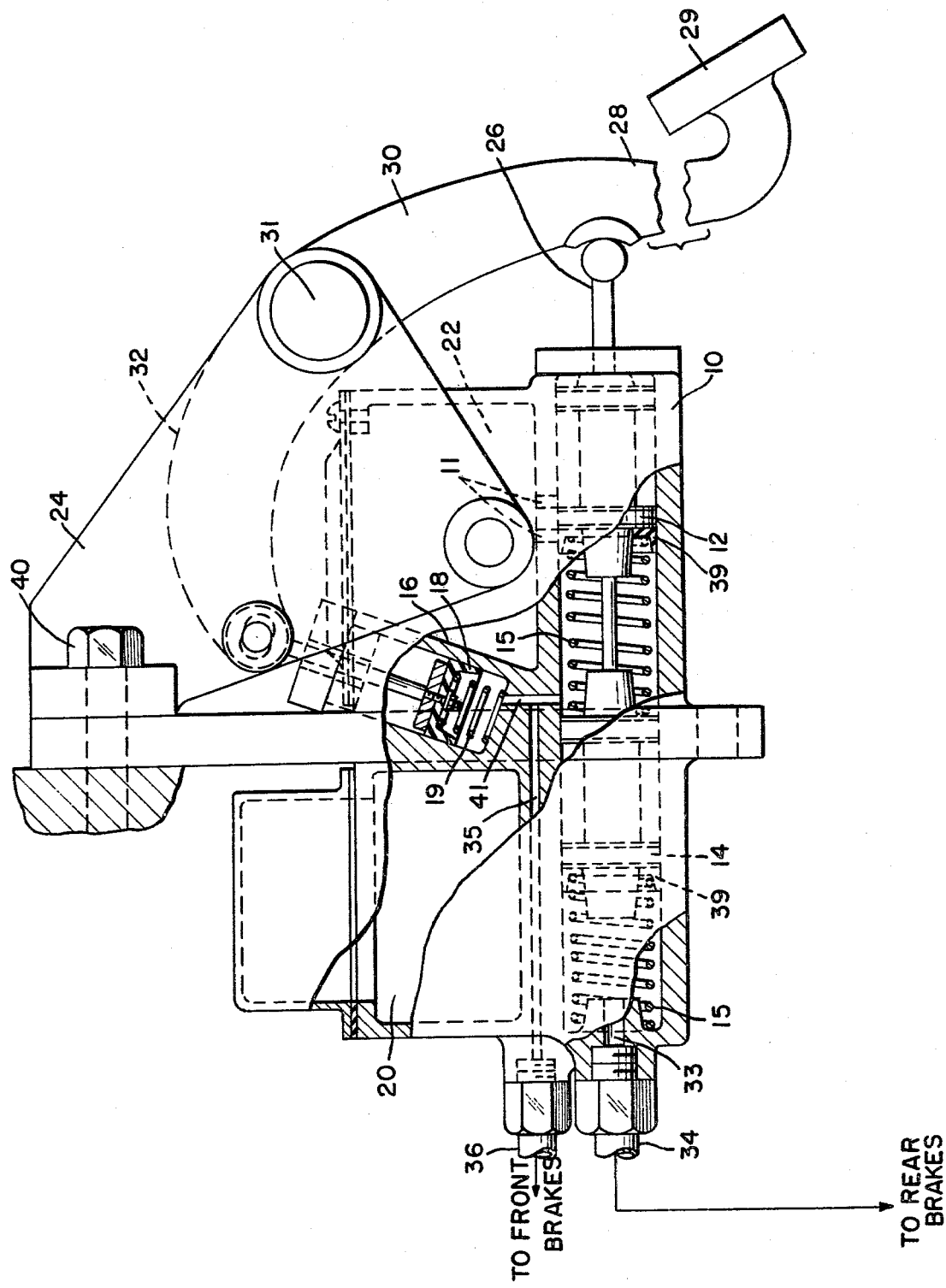

HYDRAULIC BRAKE SYSTEM

REFERENCE TO RELATED APPLICATION

This is a continuation-in-part of Ser. No. 588,670, filed June 20, 1975 now abandoned.

BACKGROUND OF THE INVENTION

1. Field of the Invention

This invention relates to brake cylinders. More particularly, it relates to an auxiliary cylinder used in conjunction with a master cylinder of a braking apparatus.

2. Description of the Prior Art

U.S. Pat. Nos. 2,322,133; 2,494,319; 3,503,210; 3,514,163; 4,015,881; 3,798,905 and 3,739,579 have to do generally with various ways of improving the force input of hydraulic brake systems, such as by power assist devices such as boosters or pumps to augment the force applied to the brake pedal to attain satisfactorily high hydraulic pressure within the brake system without requiring more physical/mechanical input from the operator. The devices of these patents, however, still do not couple as much increase in force applied with as much decrease in necessary pressure on the foot pedal as is desirable. Furthermore, for the most part, they require vacuum boosters or additional power sources.

SUMMARY OF THE INVENTION

After extended investigation, I have found that by recycling by way of an auxiliary or booster cylinder, preferably directed toward the rear, I can more than double the hydraulic pressure obtainable by way of an hydraulic brake system.

DESCRIPTION OF THE DRAWING & OF THE PREFERRED EMBODIMENT

For a better understanding of my invention, reference will now be made to the drawing, which, together with the description which follows, represents the preferred embodiment of my invention.

The drawing is a general view from one side, partly in perspective and partly in cross-section, and broken away in part to show parts such as pistons and the like inside the cylinders, of a representative hydraulic brake system according to the invention.

In the drawing, piston 12 of master cylinder 10 is actuated by a pedal 29, with the resultant hydraulic pressure generated being applied to auxiliary piston 18 via a connecting line or passageway 41 from the master cylinder 10 to an auxiliary cylinder 16, which also contains a return spring 19, thereby aiding the operation of pedal 29, which is connected to said auxiliary cylinder 16 via a brake lever 28 pivoted at 31 which includes an upper portion 32 and a middle portion 30, and to said master cylinder and piston 12 via a push rod 26. Contained within the forward chamber of master cylinder 10 are secondary piston 14, return springs 15 and annular cups 39. Forward of a reservoir 20, 22 connected to master cylinder 10 by ports 11 and said forward chamber are a rear brake line 34 connected to said chamber via port 33 and a front brake line 36 connected to passageway 41 via channel 35. Bracket 24 and mounting screw 40 are represented respectively as 24 and 40.

While I do not wish to be bound by any particular theory as to how the surprising increase in hydraulic pressure generated through use of my improved hydraulic brake system occurs or takes place, it appears that there are three distinct forces acting on master cylinder piston 12 which are the main factors causing this result. When foot pressure is applied to pedal 29, a resulting force is applied to master cylinder piston 12, the magnitude of which is determined by the leverage in pedal 29, preferably a ratio of 5:1. This force creates hydraulic pressure in the entire system and on auxiliary piston 18 via connecting line 41, with the resulting force being sent back to piston 12 via brake lever 28, pivoted at 31, and pedal 29, thereby augmenting the original force applied to pedal 29. The magnitude of this resulting force, brought about by my recycling arrangement connected to piston 12, is determined by the hydraulic pressure on auxiliary piston 18 and the leverage in pedal 29. Since this resulting force has been added to master cylinder piston 12, increased hydraulic pressure on the entire system, including auxiliary piston 18, results. This causes a further force to be returned to master cylinder piston 12, said further force being similarly recycled through pedal 29. This third force may be described as the summation of a series of diminishing increments of force, since the recycling force process repeats itself. Thus, the aforesaid three forces added together create a mechanism capable of manning the brakes without the need for a vacuum power booster or additional power source.

While the invention has been described in terms of preferred embodiments, the claims appended hereto are intended to encompass all embodiments which fall within the spirit of the invention.

Having thus described my invention and certain preferred embodiments thereof, I claim:

1. Hydraulic brake apparatus comprising a brake pedal connected to a master cylinder containing a piston actuatable by applying force to said pedal to generate hydraulic pressure ahead of said master cylinder piston for pressurizing a slave through conduit means, an auxiliary cylinder containing a second piston, an hydraulic fluid line leading from said master cylinder to said auxiliary cylinder for causing movement of said second piston in response to hydraulic pressure generated by said master cylinder piston and a brake lever pivotally mounted on a fixed pivot and having a rest position from which it is movable in two directions, said brake lever being connected to a piston rod of said second piston on one side of the fixed pivot and being in abutment connection with a piston rod of the master cylinder piston on the other side of the fixed pivot, the pressure generated by the master piston upon pivoting of the brake lever in one direction being transmitted to the second piston to cause pivoting of the brake lever in the same one direction, whereby an initial force applied to said pedal is amplified in a recycling and in an incrementally increasing manner.

2. The apparatus of claim 1 having in association with said master cylinder a reservoir and a further piston in tandem with said master cylinder piston.

3. The apparatus of claim 1 wherein said conduit means and slave comprise a brake line to rear brakes and a brake line to front brakes leaving from the front of said master cylinder.

4. The apparatus of claim 1 wherein said auxiliary cylinder is directed upwardly at an angle toward the rear from the longitudinal axis of the master cylinder.

* * * * *